(12) United States Patent  
Kaemingk et al.

(10) Patent No.: US 9,284,873 B2  
(45) Date of Patent: Mar. 15, 2016

(54) INJECTOR CONTROL FOR A SELECTIVE CATALYTIC REDUCTION SYSTEM

(71) Applicants: Nathan J. Kaemingk, Lynden, WA (US); Michael Gerty, Bellingham, WA (US)

(72) Inventors: Nathan J. Kaemingk, Lynden, WA (US); Michael Gerty, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 59 days.

(21) Appl. No.: 14/336,974

(22) Filed: Jul. 21, 2014

(65) Prior Publication Data

US 2014/0325966 A1 Nov. 6, 2014

Related U.S. Application Data

(63) Continuation of application No. 12/833,884, filed on Jul. 9, 2010, now Pat. No. 8,793,977.

(51) Int. Cl.
*F01N 3/00* (2006.01)
*F01N 3/20* (2006.01)
*F01N 9/00* (2006.01)

(52) U.S. Cl.
CPC *F01N 3/208* (2013.01); *F01N 9/00* (2013.01); *F01N 2610/02* (2013.01); *F01N 2900/1808* (2013.01); *F01N 2900/1812* (2013.01); *Y02T 10/24* (2013.01); *Y02T 10/47* (2013.01)

(58) Field of Classification Search
CPC .... F01N 9/00; F01N 3/208; F01N 2900/1812
USPC ........................................... 60/277, 286, 299
See application file for complete search history.

(56) References Cited

U.S. PATENT DOCUMENTS

| | | |
|---|---|---|
| 4,357,923 A | 11/1982 | Hideg |
| 4,388,906 A | 6/1983 | Sugiyama |
| 4,939,658 A | 7/1990 | Sekozawa |
| 5,809,775 A | 9/1998 | Tarabulski |
| 5,819,714 A | 10/1998 | Bush |
| 5,924,280 A | 7/1999 | Tarabulski |
| 5,968,464 A | 10/1999 | Peter-Hoblyn |
| 5,976,475 A | 11/1999 | Peter-Hoblyn |
| 6,203,770 B1 | 3/2001 | Peter-Hoblyn |
| 6,361,754 B1 | 3/2002 | Peter-Hoblyn |
| 6,415,602 B1 | 7/2002 | Patchett |
| 6,546,720 B2 | 4/2003 | van Nieuwstadt |
| 6,581,374 B2 | 6/2003 | Patchett |
| 6,662,553 B2 | 12/2003 | Patchett |
| 6,928,806 B2 | 8/2005 | Tennison |
| 6,993,900 B2 | 2/2006 | Upadhyay |
| 7,093,427 B2 | 8/2006 | van Nieuwstadt |
| 7,150,145 B2 | 12/2006 | Patchett |

(Continued)

*Primary Examiner* — Audrey K Bradley
*Assistant Examiner* — Anthony Ayala Delgado
(74) *Attorney, Agent, or Firm* — Christensen O'Connor Johnson Kindness PLLC

(57) ABSTRACT

Systems and methods are provided for controlling the amount and timing of nitrogen oxide reductant injected during a given injection cycle into an exhaust system of a vehicle as part of a selective catalytic reduction system. The amount of reductant injected is determined by at least one computational model that accounts for the growth of liquid and/or solid reductant film growth on the interior of the exhaust system. The model determines reductant injection characteristics (e.g., amount, timing, etc.) that reduce and/or eliminate reductant films on the interior of the exhaust system. Exemplary inputs into the model include exhaust temperature, exhaust flow, and the amount of reductant injected in a previous injection cycle.

19 Claims, 5 Drawing Sheets

(56) References Cited

U.S. PATENT DOCUMENTS

| | | |
|---|---|---|
| 7,200,990 B2 | 4/2007 | Gabrielsson |
| 7,418,816 B2 | 9/2008 | Upadhyay |
| 7,426,825 B2 | 9/2008 | Viola |
| 7,454,982 B2 | 11/2008 | Palazzolo |
| 7,610,750 B2 | 11/2009 | Viola |
| 7,613,561 B1 | 11/2009 | Stewart |
| 8,209,956 B2 | 7/2012 | Wei |
| 2007/0042495 A1 | 2/2007 | Pavlova-MacKinnon |
| 2007/0044456 A1 | 3/2007 | Upadhyay |
| 2007/0119147 A1 | 5/2007 | Cornwell |
| 2009/0031710 A1 | 2/2009 | Wei |
| 2009/0133383 A1 | 5/2009 | Shost |
| 2009/0301066 A1 | 12/2009 | Sindano |
| 2010/0139257 A1 | 6/2010 | Driscoll |
| 2010/0300074 A1 | 12/2010 | Mullins |
| 2011/0088372 A1 | 4/2011 | Yamamoto |

INJECTOR CONTROL FOR A SELECTIVE CATALYTIC REDUCTION SYSTEM

CROSS-REFERENCE TO RELATED APPLICATION

This application is a continuation of U.S. patent application Ser. No. 12/833,884, filed Jul. 9, 2010, the disclosure of which is incorporated by reference herein in its entirety.

BACKGROUND

New air-pollution limits for diesel engines have caused some manufacturers to adopt selective catalytic reduction (SCR) technology for reducing nitrogen oxides (NOx) in engine exhaust. The SCR process introduces or injects an NOx reductant (e.g., a NOx reductant-water solution) into the hot exhaust gas, which chemically reduces NOx into non-pollutant compounds. When introduced, the NOx reductant-water solution undergoes a decomposition process that releases ammonia into the exhaust stream to facilitate NOx reduction in the SCR process.

One type of prior art diesel engine exhaust system that employs an SCR process is illustrated in FIG. 1. As best shown in FIG. 1, a diesel engine 4 produces NOx as a component of an exhaust stream. The exhaust stream is directed from an exhaust port (not shown) of the engine 4 to a doser or injector section 8 through an exhaust pipe 10. The doser or injector section 8 includes a NOx reductant doser or injector 12 that is configured to inject a solution of NOx reductant (or other nitrogen oxides reductant) into the exhaust stream present in the doser or injector section 8.

After the NOx reductant doser or injector 12 injects NOx reductant into the exhaust stream, the exhaust travels through an exhaust pipe 14 to a catalytic section 16, where the NOx reductant and a catalyst within the catalytic section 16 react to reduce the nitrogen oxides into non-pollutant species. The reduced nitrogen oxides and remaining exhaust components are then directed out of the vehicle through an exhaust outlet pipe 18.

However, during typical operation of an engine, the conditions for the SCR decomposition process are not optimal (e.g., exhaust is too hot or cold) and either too much, or too little, NOx reductant solution is introduced into the exhaust. When introduced or injected NOx reductant solution fails to undergo the SCR decomposition process (e.g., too much NOx reductant solution for the exhaust temperature), NOx reductant crystals will accumulate within the exhaust system, both on the interior surface of the exhaust pipe and at the port that introduces the solution into the exhaust. Build up of NOx reductant crystals in the exhaust system detrimentally affects the performance of the exhaust system, and also is indicative of inefficiency in the SCR process: NOx reductant crystals represent both wasted NOx reductant solution and reduced SCR efficiency.

During injection of NOx reductant into the diesel exhaust stream as part of the SCR process there is a significant amount of the total NOx reductant injected that contacts the walls of the exhaust pipe and becomes a liquid wall film. While this process occurs, the NOx reductant that is wetting the pipe walls does not reach the catalyst for its intended use and the intended quantity of reductant is not available in the catalyst.

Prior attempts at avoiding such "wall wetting" NOx reductant build up have been only moderately successful. The primary method for avoiding NOx reductant build up is the use of a limiting table whereby a NOx reductant injector limits NOx reductant injection to a predetermined amount based on average engine conditions as defined by a lookup-table. The limiting table is primarily focused on preventing NOx reductant build up and, thus, the resulting SCR performance is compromised because the amount of NOx reductant reaching the catalyst is typically less than is required for optimal SCR performance.

Therefore, a system and method is desired for optimizing the injection of NOx reductant solution into the exhaust of an operating diesel engine such that the SCR catalyst is provided sufficient NOx reductant while NOx reductant build up prior to the catalyst is minimized.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a method for determining an amount of a reductant solution for nitrogen oxides to be injected by an injector into an exhaust flow, from an engine producing nitrogen oxides, towards a catalyst, is provided. The method comprises the steps of: determining a first value of a first operating parameter; determining a first value of a second operating parameter; determining a first injector flow rate of the reductant solution injected into the exhaust flow by the injector; determining a first reductant solution puddle size, wherein the first reductant solution puddle size is determined using the determined first value of the first operating parameter, the determined first value of the second operating parameter, and the first injector flow rate; determining a reductant solution puddle delta, wherein the reductant solution puddle delta is determined using the determined first value of the first operating parameter, the determined first value of the second operating parameter, the first injector flow rate, and the first reductant solution puddle size; and determining a second injector flow rate of the reductant solution using the reductant solution puddle delta and the first injector flow rate of the reductant solution.

In accordance with another aspect of the present disclosure, a computer-implemented method is provided for determining an amount of a reductant solution for nitrogen oxides to be injected by an injector into an exhaust flow, from an engine producing nitrogen oxides, towards a catalyst. The method comprises the steps of: receiving a first value of a first operating parameter input; receiving a first value of a second operating parameter input; receiving a first injector flow rate input; determining a first reductant solution puddle size, wherein the first reductant solution puddle size is determined using the first value of the first operating parameter input, the first value of the second operating parameter input, and the first injector flow rate input; determining a reductant solution puddle delta, wherein the reductant solution puddle delta is determined using the first value of the first operating parameter input, the first value of the second operating parameter input, the first injector flow rate input, and the first reductant solution puddle size; and determining a second injector flow rate of the reductant solution using the reductant solution puddle delta and the first injector flow rate input.

In accordance with yet another aspect of the present disclosure, a system is provided for injecting a determined amount of a reductant solution for nitrogen oxides into an exhaust flow from an engine producing nitrogen oxides. The system comprises: an injector configured to inject the reductant solution into the exhaust flow according to a first injector flow rate; a first sensor configured to measure a first operating parameter of the exhaust flow; a second sensor configured to measure a second operating parameter of the exhaust flow; and a wall wetting controller. The wall wetting controller is configured to: determine a first reductant solution puddle size, wherein the first reductant solution puddle size is determined using measured values of the first operating parameter, the second operating parameter, and the first injector flow rate; determine a reductant solution puddle delta, wherein the reductant solution puddle delta is determined using the first operating parameter, the second operating parameter, the first injector flow rate, and the first reductant solution puddle size; and transmit a first control signal to the injector, wherein the first control signal is determined by the reductant solution puddle delta and the first injector flow rate, and wherein the first control signal adjusts the first injector flow rate to a second injector flow rate.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
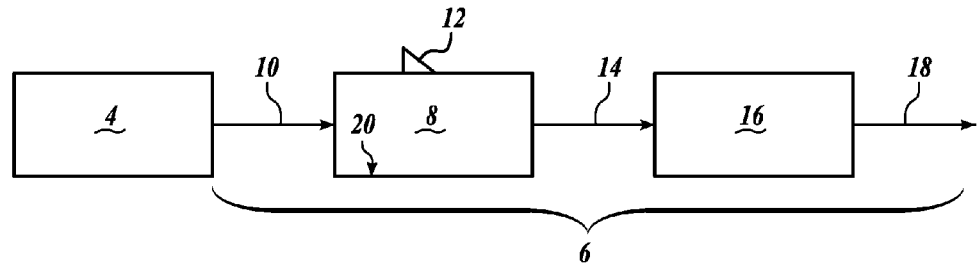
FIG. 1 is a schematic diagram of a prior art exhaust system.

Embodiments of the present disclosure will now be described with reference to the drawings, where like numerals correspond to like elements. Embodiments of the present disclosure are generally directed to systems and methods for controlling the amount and/or timing of nitrogen oxides (NOx) reductant (e.g., NOx reductant, used as an exemplary embodiment herein) injected into an exhaust system of a diesel powered vehicle, such as a Class 8 truck. By controlling the amount and/or timing of NOx reductant injected into the exhaust system, a reduction in the detrimental formation of NOx reductant films, both liquid and solid, on interior surfaces of the exhaust system may be achieved. More particularly, embodiments of the present disclosure are directed to methods and systems that determine, using one or more measured characteristics or operating parameters of the exhaust system (e.g., exhaust temperature, flow rate, etc.), the amount of NOx reductant to be injected into the exhaust system so as to balance the needs of the SCR system for reducing NOx produced by the engine while reducing NOx reductant film formation.

Embodiments of the present disclosure utilize one or more models that determine the amount of NOx reductant to be injected into an exhaust system at a given time. In several embodiments of the present disclosure, the amount of NOx reductant to be injected into an exhaust system is based on measured or sensed conditions within the system and predictive calculations of the amount of unused NOx reductant existing in the system (e.g., as a film on the interior walls of the exhaust system, etc.). One goal of the present disclosure among others is to reduce buildup of liquid and solid NOx reductant on the surfaces of the exhaust system by limiting NOx reductant injection when the model predicts that excess NOx reductant is building in the exhaust system.

It should also be understood that several sections of the following description regarding models, controllers or other computing devices for implementing the models, etc., are presented largely in terms of logic and operations that may be performed by conventional electronic components. These electronic components, which may be grouped in a single location or distributed over a wide area, may generally include processors, memory, input devices (e.g., sensors, etc.), etc. It will be appreciated by one skilled in the art that the logic described herein may be implemented in a variety of configurations, including software, hardware, or combinations thereof. The hardware may include but is not limited to, analog circuitry, digital circuitry, processing units, application specific integrated circuits (ASICs), and the like. In circumstances where the components are distributed, the components are accessible to each other via communication links.

Although exemplary embodiments of the present disclosure will be described hereinafter with reference to over-the-road vehicles, particularly diesel-powered, heavy-duty trucks, it will be appreciated that aspects of the present disclosure have wide application, and therefore, may be suitable for use with many other types of vehicles that include a urea or other nitrogen-oxides reductant injection system for treating nitrogen oxides emissions in an exhaust stream, such as automobiles, recreational vehicles, boats, etc. Examples of the subject matter of the present disclosure may find other applications, such as the treatment of exhaust streams of stationary or portable generators, etc. Accordingly, the following descriptions and illustrations herein should be considered illustrative in nature, and thus, not limiting the scope of the claimed subject matter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

Various embodiments of the present disclosure employ computational models for at least one of the formation of liquid NOx reductant (the "Wall Wetting Model" 90) and solid NOx reductant (the "Crystallization Model" 150) films within an exhaust system, such as a vehicle exhaust system. It will be appreciated that the development of NOx reductant films on a surface of an exhaust system may depend on several factors, including but not limited to the amount (and timing) of NOx reductant injected into the system by the NOx reductant doser or injector, the temperature of the exhaust gas, the rate of flow of the exhaust gas, exhaust pipe diameter, exhaust pipe surface area, ambient air temperature (outside of pipes), NOx reductant evaporation time constant, exhaust water content (i.e., humidity or DewPoint), vehicle speed (airflow over exhaust system), etc. As will be described in more detail below, the models 90 and 150 may utilize the measured or sensed values of one or more of such factors in order to alter the control parameters (e.g., amount, timing, etc.) of a NOx reductant doser or injector of a SCR system for reducing NOx reductant film formation on inner surfaces of the exhaust system.

Figure 2:
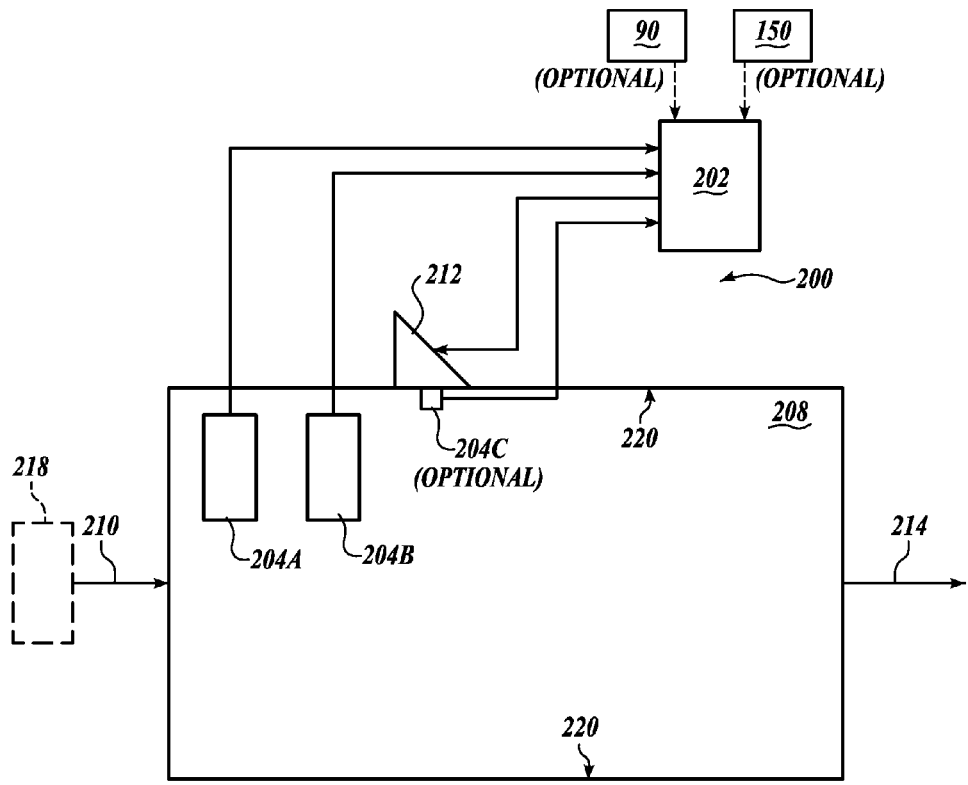
FIG. 2 is a diagrammatic illustration of one embodiment of an exhaust system for controlling injection of a nitrogen oxides reductant solution into the exhaust system in accordance with aspects of the present disclosure.

Turning now to FIG. 2, there is shown a partial view of an exemplary SCR system, designated 200, suitable for use with an exhaust system of a vehicle, such as a class 8 diesel powered truck. As best shown in FIG. 2, the SCR system 200 includes a doser or injector 212 associated with an exhaust system section 208, also known as a doser or injector section 208, of the exhaust system. The exhaust system section 208 receives an exhaust gas stream from a source of NOx 218 (e.g., the vehicle's diesel engine) via an exhaust pipe 210. As the exhaust stream passes through the exhaust system section 208, the doser or injector 212 injects an NOx reductant into the stream of exhaust gas. After passing through the exhaust system section 208, the exhaust stream (e.g., treated with NOx reductant) is transported further "downstream" by exhaust pipe 214 to a catalyst, etc. (not shown). As shown in FIG. 2, the exhaust system section 208 defines one or more inner surfaces 220 onto which an amount of NOx reductant may form.

In the embodiment shown in FIG. 2, the SCR system 200 further includes a controller 202 for implementing the NOx reductant film-formation models (e.g., Wall Wetting Model 90 and Crystallization Model 150). In one embodiment, the controller 202 may include any suitable component or device and/or combinations thereof, that is capable of receiving input signals from one or more sensors, etc., processing and/or storing the input signals, retrieving data from memory or other systems of the vehicle, and generating appropriate control signals for output to the injector 212.

As used herein, controllers, control units, control modules, program modules, etc., can contain logic for carrying out general or specific operational features of the present disclosure. The logic can be implemented in hardware components, such as analog circuitry, digital circuitry, processing units, or combinations thereof, or software components having instructions which can be processed by the processing units, etc. Therefore, as used herein, the term "controller" or "controlling component" can be used to generally describe these aforementioned components, and can be either hardware or software, or combinations thereof, that implement logic for carrying out various aspects of the present disclosure.

The SCR system 200 further includes one or more sensors 204 associated with, for example, the exhaust system section 208. In one embodiment, the one or more sensors 204 may include but are not limited to a temperature sensor 204A, an exhaust flow rate sensor 204B, and an optional NOx reductant flow sensor 204C. The sensors 204 provide input signals to the controller 202 for utilization by the NOx reductant film-formation models (e.g., Wall Wetting Model 90 and Crystallization Model 150). The controller 202 additionally outputs control signals to the NOx reductant injector 212 based on the results of the NOx reductant film-formation models (e.g., Wall Wetting Model 90 and/or Crystallization Model 150) for controlling the amount and/or timing of NOx reductant to be injected by the NOx reductant injector 212 in the next injection cycle.

Figure 3:
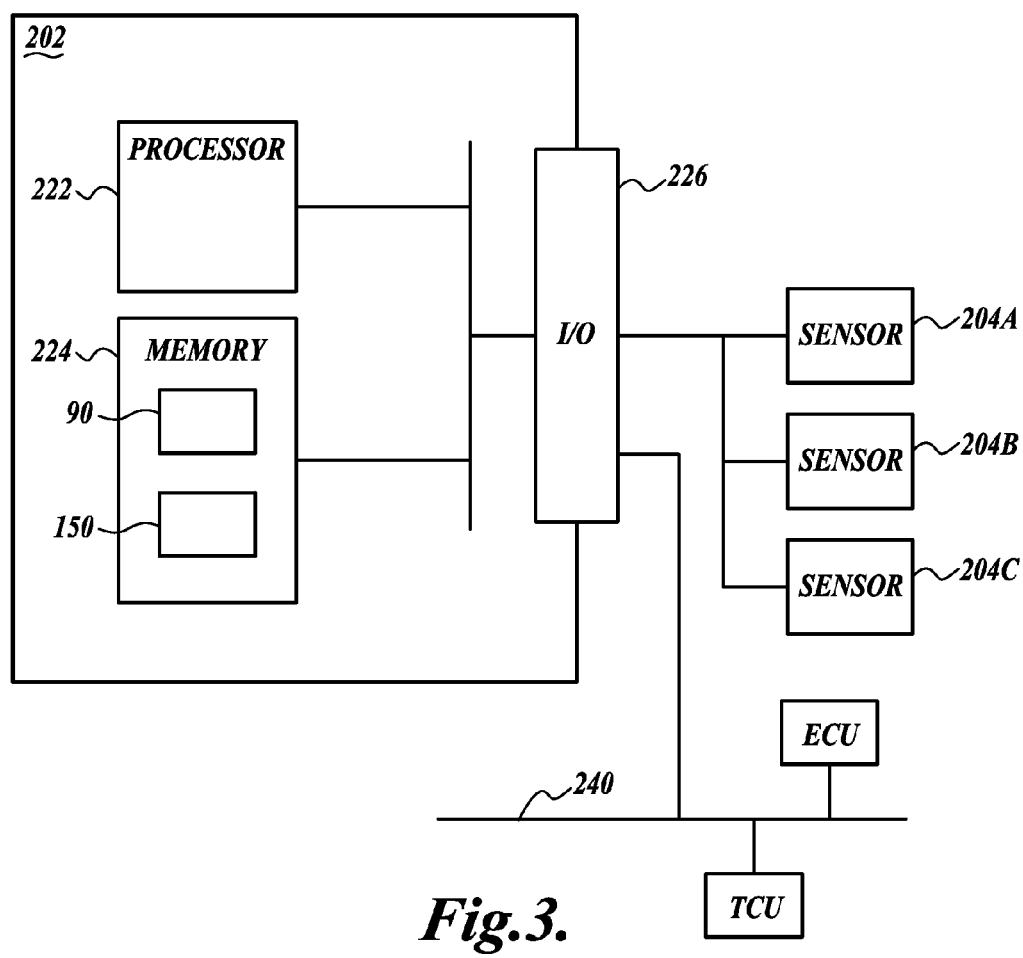
FIG. 3 is a schematic diagram of one exemplary embodiment of a controller formed in accordance with aspects of the present disclosure.

It will be appreciated that the controller 202 and any one of the various sensors, etc., herein described may contain logic rules implemented for carrying out various aspects of the disclosed subject matter. To that end, one suitable example of the controller 202 is shown in FIG. 3. As best shown in FIG. 3, the controller 202 includes a processor 222 and memory 224 with a Random Access Memory ("RAM"), an Electronically Erasable, Programmable, Read-Only Memory ("EEPROM") and any other suitable data storage means. Stored as executable instructions in memory are program modules, which can include routines, programs, objects, components, data structures, etc., that perform particular tasks or implement particular abstract data types. In one embodiment, the program modules may include but are not limited to the models 90 and model 150.

The controller 202 is connected by an input/output (I/O) interface 226 to various sensors, such as temperatures sensor 204A, exhaust flow sensor 204B, and optional NOx reductant flow sensor 204C. Other systems, devices and/or controllers of the vehicle not illustrated but known in the art, such as an engine control unit (ECU), transmission control unit (TCU), etc., can also be connected to the interface 226 via a vehicle-wide network 240 or other communication link. In that regard, the controller 202 may receive other vehicle or system data, such as vehicle speed data, engine speed data, fuel consumption data, humidity and/or Dew point data, ambient temperature data external to the exhaust system, etc.

Returning to FIG. 2, the temperature sensor 204A, the exhaust flow sensor 204B and the optional NOx reductant flow sensor 204C measure or sense an exhaust system condition and transmit signals indicative of such exhaust system conditions to the controller 202. The temperature sensor 204A measures the temperature of exhaust gas passing through the exhaust system section 208 at the location of the temperature sensor 204A. The temperature sensor 204A can be any temperature sensor known to those of skill in the art. An exemplary temperature sensor 204A useful in the system is a thermocouple. The temperature sensor 204A is operatively connected to the controller 202 to deliver a signal indicating the temperature measured in the exhaust system at the location of the temperature sensor 204A at a given time.

The exhaust flow sensor 204B of the system 200 measures the flow of exhaust gas passing through the exhaust system section 208 at the location of the exhaust flow sensor 204B. The exhaust flow sensors 204B can be any exhaust flow sensor known to those of skill in the art. The exhaust flow sensor 204B is operatively connected to the controller 202 to deliver a signal indicating the exhaust flow at the location of the exhaust flow sensor 204B at a given time.

The optional NOx reductant flow sensor 204C is used to measure the flow of NOx reductant from the NOx reductant injector 212 passing into the exhaust system section 208. The NOx reductant flow sensor 204C can be any liquid flow sensor known to those of skill in the art. The NOx reductant flow sensor 204C is operatively connected to the controller 202 to deliver a signal indicating the flow of NOx reductant injected from the injector 212 at a given time.

It will be appreciated that the NOx reductant injector 212 in some embodiments does not inject NOx reductant in a continuous stream, but instead injects in cycled bursts depending on the NOx reductant demand indicated by the controller 202. Thus, for example, if the controller 202 indicates that more NOx reductant is needed in the system 200 as a result, for example, of exhaust gas temperature and/or flow, the controller 202 will instruct the NOx reductant injector 212 via appropriate control signals to inject an amount of NOx reductant appropriate for the conditions within the exhaust system.

However, because the amount of NOx reductant the controller 202 instructs the NOx reductant injector 212 to inject is not always the same as the actually-delivered amount of NOx reductant, the NOx reductant flow sensor 204C can be used to increase the accuracy of the provided models 90 and 150 and to provide a more accurate system for reducing built-up NOx reductant films in the exhaust system.

Figure 4:
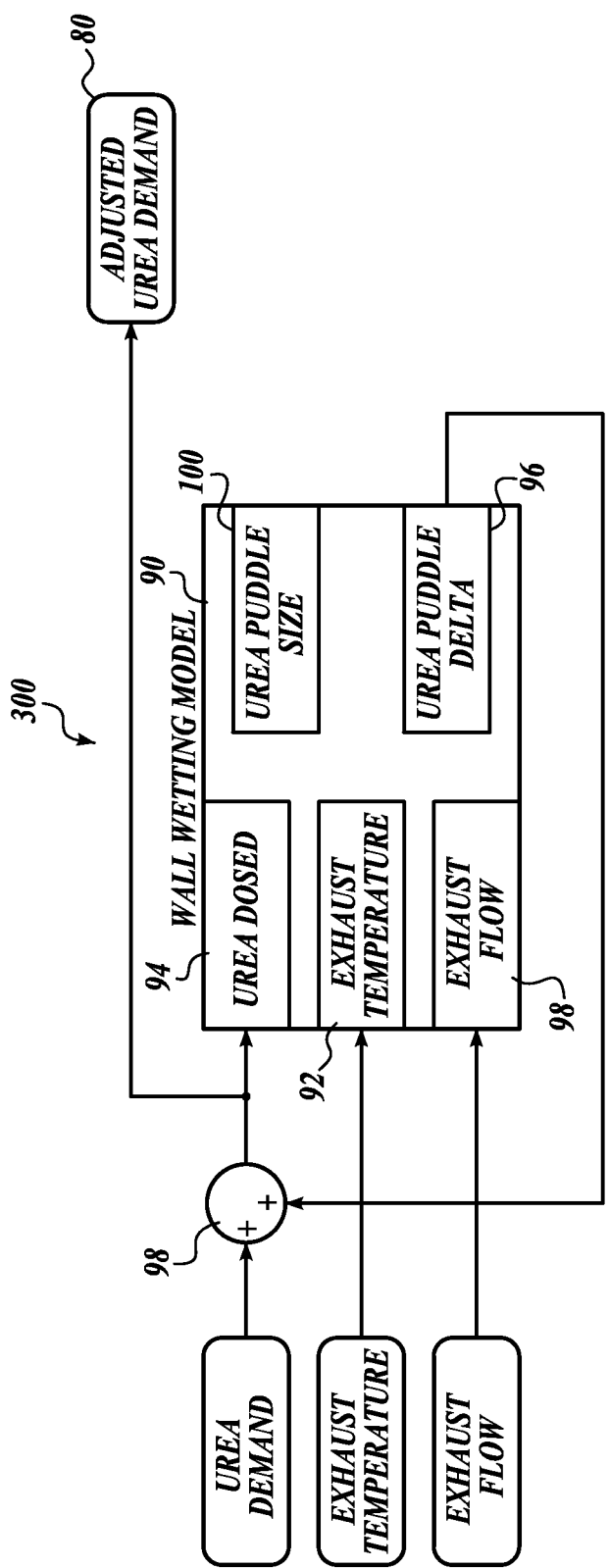
FIG. 4 is a schematic diagram of an embodiment of a method for controlling injection of a nitrogen oxides reductant solution into an exhaust system in accordance with aspects of the present disclosure.

Referring now to FIG. 4, a schematic diagram of an exemplary Wall Wetting model 90 of the present disclosure is illustrated. The Wall Wetting model 90 implements a feed-forward adjustment of NOx reductant solution injected during an SCR process. In the described embodiments, the terms urea and NOx reductant are used interchangeably, although other NOx reductants can be used. Generally described, the Wall Wetting Model 90 predicts a current amount of NOx reductant 100, referred to as the urea puddle size that will wet the interior surface 220 of the exhaust system section 208. The model 90 then utilizes several measured or sensed conditions or operating parameters, for example, of the exhaust system to determine a change (either positive or negative) in the NOx reductant solution flow, referred to herein as the NOx reductant puddle delta, in order to reduce (or eliminate) the NOx reductant liquid wetting of the interior surface 220, while still supplying sufficient NOx reductant to the SCR process. These conditions or parameters may include but are not limited to the temperature of the exhaust gas, the rate of flow of the exhaust gas, exhaust pipe diameter, exhaust pipe surface area, ambient air temperature (outside of pipes), NOx reductant evaporation time constant, exhaust water content (i.e., humidity or DewPoint), vehicle speed (airflow over exhaust system), etc. In other words, the model 90 attempts to balance the need for NOx reductant in the SCR process and the desire to reduce and eliminate NOx reductant build up on the interior surface 220 of the exhaust system.

As implemented in several embodiments, the Wall Wetting Model 90 is used to determine the change in the amount of NOx reductant injected by changing a first injector flow rate to a modified or second injector flow rate as a result of determining the NOx reductant puddle delta. Further iterations of the Wall Wetting Model 90 then adjust the second injector flow rate to a third injector flow rate, and so on.

The Wall Wetting Model 90 will now be described in more detail. In the embodiment shown in FIG. 4, the Wall Wetting Model 90 utilizes exhaust system parameters, although other types and/or numbers of variables may be employed. For example, in one embodiment, the Wall Wetting Model 90 utilizes NOx reductant dosed 94, exhaust temperature 92, and exhaust flow 98. The exhaust temperature 92 and exhaust flow 98 inputted into the Wall Wetting Model 90 are provided by the temperature sensor 204A (FIG. 2) and the exhaust flow sensor 204B (FIG. 2), respectively.

The NOx reductant dosed 94, in one embodiment, is indicative of a NOx reductant demand that can be a predetermined value representing the amount of NOx reductant (a first injector flow rate) that the NOx reductant injector 212 is instructed to deliver (e.g., by controller 202). Alternatively, since the amount of NOx reductant instructed to be delivered and the amount actually delivered can be different, other embodiments may input the actual urea dosed into the Wall Wetting Model 90 (as the urea dosed 94 variable) as determined by the NOx reductant flow sensor 204C (see FIGS. 5 and 6), instead of the NOx reductant demand.

Referring again to FIG. 4, once inputted into the model 90, the urea dosed 94, the exhaust temperature 92 and the exhaust flow 98 are used to determine a NOx reductant puddle size 100 and a NOx reductant puddle delta 96. For example, the NOx reductant puddle size 100 is a calculated prediction of the amount of liquid NOx reductant formed on the interior surface 220 at a particular time. The NOx reductant puddle size 100 is determined using NOx reductant dosed 94, exhaust temperature 92, and exhaust flow 98. The Wall Wetting Model 90 calculates the NOx reductant puddle size 100 using equations for modeling the dynamics of liquid behavior known to those of skill in the art.

On the other hand, the NOx reductant puddle delta 96 is the change (either increase or decrease) in the NOx reductant demand determined by the Wall Wetting Model 90 that will reduce and/or eliminate the liquid NOx reductant determined to exist in the exhaust system according to the calculated NOx reductant puddle size 100. The NOx reductant puddle delta 96 may also indicate that no change is needed to the NOx reductant demand of the present injection cycle. The NOx reductant puddle delta 96 is determined, using modeling methods known to those of skill in the art, by the Wall Wetting Model 90 using the NOx reductant dosed variable 94, the exhaust temperature variable 92, the exhaust flow variable 98, in conjunction with the determined value of the NOx reductant puddle size 100.

One purpose of the Wall Wetting Model 90 is to determine the adjustment to future NOx reductant injection cycles that will act to reduce the wetting of NOx on the surface of the exhaust system injector section 208. This adjustment to the amount of NOx to be injected is illustrated in FIG. 4 as the adjusted NOx reductant demand 80. The adjusted NOx reductant demand 80 is determined by combining at addition point 98 the NOx reductant puddle delta 96 calculated by the Wall Wetting Model 90 with the predetermined NOx reductant demand. The adjusted NOx reductant demand 80, as a result of the combination of the NOx reductant puddle delta 96 and the NOx reductant demand, is then utilized by the controller to generate and/or transmit appropriate control signals to the injector 212. Therefore, the adjusted NOx reductant demand 80 is the amount of NOx reductant determined by the Wall Wetting Model 90 to be injected in an injection cycle by the NOx reductant injector 212 into the exhaust system to satisfy the SCR system requirements for amount of NOx reductant needed, as well as to reduce the formation of liquid NOx reductant on interior surfaces 220 of the exhaust system.

It will be appreciated that the adjusted NOx reductant demand 80 is also employed by the Wall Wetting Model 90 as the NOx reductant dosed variable 94 for the next cycle. Thus, the cyclical nature of the Wall Wetting Model 90 of FIG. 4 is illustrated: the NOx reductant dosed variable 94 is used to calculate the NOx reductant puddle delta 96, which then affects the NOx reductant dosed variable 94 when combined with the NOx reductant demand 50 input. Further, the adjusted NOx reductant demand 80 then becomes the NOx reductant demand for the next cycle of the method, which will determine the next adjusted NOx reductant demand 80 required by the system, and so on.

As described above, the Wall Wetting Model 90 can be executed and implemented in the controller 202, although the Wall Wetting Model 90 can also be implemented in a computational logic device, as known to those of skill in the art (e.g., a computer, an applications-specific integrated circuit (ASIC), a field-programmable gate array (FPGA), etc.), separate from the controller 202. The results of the model (i.e., adjusted NOx reductant demand 80, 120, or 156) may then be subsequently transmitted to the controller 202 for processing and control of the injector 212. Similarly, the Crystallization Model 150 can also be integrated into the controller 202 or housed in a separate logic device (not illustrated).

Figure 5:
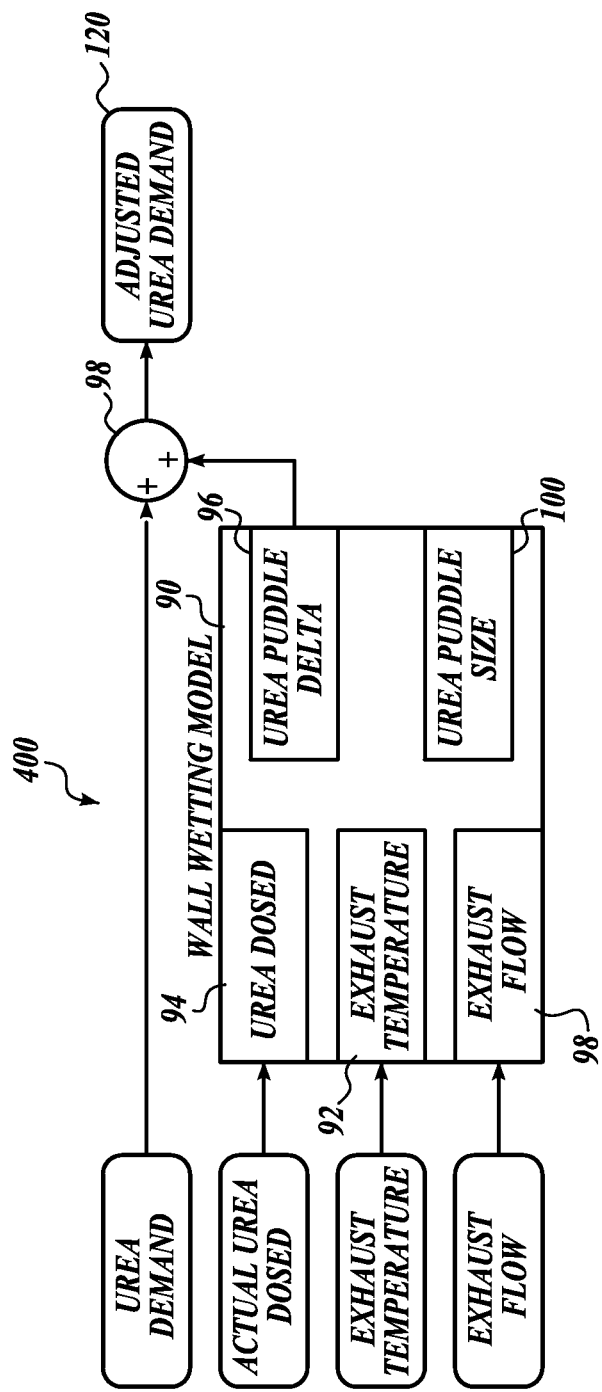
FIG. 5 is a schematic diagram of another embodiment of a method for controlling injection of a nitrogen oxides reductant solution into an exhaust system in accordance with aspects of the present disclosure.

Turning now to FIG. 5, there is illustrated another embodiment of the present disclosure. In this embodiment, the Wall Wetting Model 90, as described above, is used in a system 400 having the same outputs, NOx reductant puddle size 100 and NOx reductant puddle delta 96, but modified inputs compared to the system 300 of FIG. 4. In that regard, the NOx reductant dosed variable 94 of the Wall Wetting Model 90 is determined by an actual NOx reductant dosed input instead of a NOx reductant demand input. The difference between the actual NOx reductant dosed and the NOx reductant demand is that the actual NOx reductant dosed is based on the NOx reductant amount actually injected by the NOx reductant injector 212, as measured by a NOx reductant flow sensor 204C (see FIG. 2). On the other hand, the NOx reductant demand is an ideal value that represents the amount of NOx reductant that the NOx reductant injector 212 is instructed to inject (e.g., by controller 202); however, due to various failure mechanisms (e.g., mechanical failure of the NOx reductant injector 212), the actual amount of NOx reductant dosed does not always match the instructed amount of NOx reductant to be injected. Thus, by using the NOx reductant flow sensor 204C and incorporating the output from the sensor 204C (i.e., the actual NOx reductant dosed) into the Wall Wetting Model 90 as the NOx reductant dosed variable 94, the Wall Wetting Model 90 provides for a more accurate overall determination of the NOx reductant puddle size 100 and NOx reductant puddle delta 96 resulting from the Wall Wetting Model 90.

Figure 6:
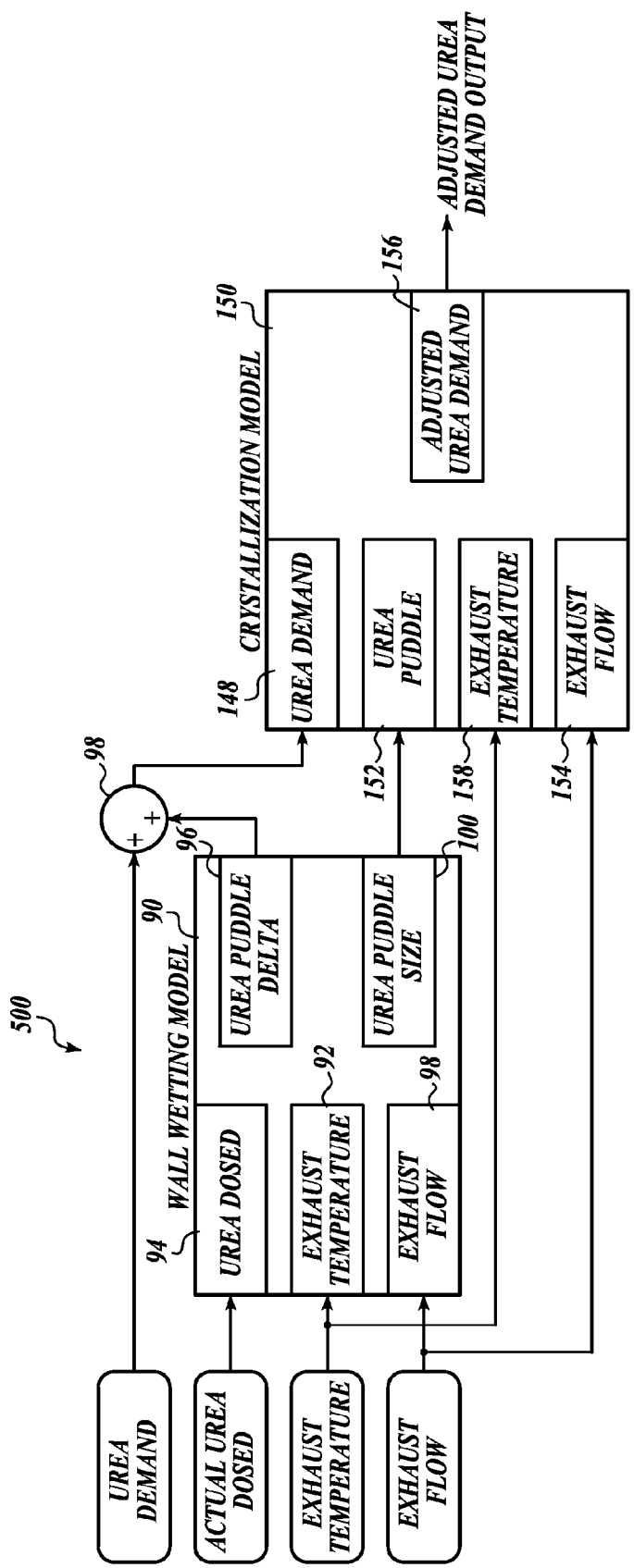
FIG. 6 is a schematic diagram of yet another embodiment of a method for controlling injection of a nitrogen oxides reductant solution into an exhaust system in accordance with aspects of the present disclosure.

In yet another embodiment of the present disclosure, a system 500 may also implement a Crystallization Model 150 in addition to the Wall Wetting Model 90, as illustrated in the schematic diagram of FIG. 6. In the system 500, the Crystallization Model 150 takes into account the possibility that liquid NOx reductant adhered to an interior surface 220 of the exhaust system 200 will crystallize into a solid NOx reductant film under certain conditions (e.g., temperature and exhaust flow conditions).

To that end, the Crystallization Model 150 calculates the amount of NOx reductant to be injected (referred to as adjusted NOx reductant demand 156) to optimally remove both solid and liquid NOx reductant films from the exhaust system 200 while maintaining the demand for NOx reductant of the SCR system. Solid NOx reductant is removed by adjusting the exhaust conditions (e.g., temperature and/or NOx reductant amount injected. etc.) such that solidified NOx reductant is re-liquefied so that it can be transported in the exhaust to its intended destination of the catalyst.

The Crystallization Model 150 utilizes a number of variables to calculate the adjusted NOx reductant demand 156. The Crystallization Model 150 calculates the adjusted NOx reductant demand 156 using equations for modeling the dynamics of solid/liquid behavior known to those of skill in the art. Similar to the Wall Wetting Model 90, the Crystallization Model 150 uses exhaust temperature 158 and exhaust flow 154, provided by the exhaust temperature sensor 204A and the exhaust flow sensor 204B, respectively. The Crystallization Model 150 additionally includes a NOx reductant puddle 152 variable, which is determined by the Wall Wetting Model 90 as the NOx reductant puddle size 100. Finally, the Crystallization Model 150 uses a NOx reductant demand 148 variable, which is determined by combining the NOx reductant puddle delta 96 output by the Wall Wetting Model 90 with the NOx reductant demand at addition point 98 to provide the NOx reductant demand 148. Therefore, the NOx reductant demand variable 148 of the system 500 is similar to the adjusted NOx reductant demand 120 determined by the system 400 illustrated in FIG. 5 (which does not take into account the Crystallization Model 150).

The Crystallization Model 150 calculates an adjusted NOx reductant demand 156, which is then outputted as the adjusted NOx reductant demand output. Similar to the adjusted NOx reductant demand 80 (as illustrated in FIG. 4) and the adjusted NOx reductant demand 120 (as illustrated in FIG. 5), the adjusted NOx reductant demand 156 illustrated in FIG. 6 is the calculated amount of NOx reductant to be injected by the NOx reductant injector 212 in a future injection cycle. Essentially, the adjusted NOx reductant demand 80, 120, or 156 then becomes the NOx reductant demand variable for the next iteration of the method (i.e., the next injection cycle).

It will be appreciated that the Wall Wetting Model 90 and Crystallization Model 150 need not be limited to calculating adjusted urea demand based on modeling specific to the interior surface 220 of the exhaust system section 208, as illustrated in FIG. 2 and described herein. The models 90 and/or 150 can calculate adjusted urea demands based on modeled conditions throughout the exhaust system, including multiple locations in the same model. For example, adjusted urea demand can be determined in relation to the exhaust pipe, the catalyst (not pictured), or an exhaust mixer (not pictured) intermediate the catalyst and exhaust pipe.

Furthermore, when calculating adjusted urea demand, the models 90 and 150 can each incorporate multiple locations throughout the exhaust system. For example, the crystallization model 150 can calculate the urea demand (using the same inputs as in FIG. 6) by calculating urea crystallization in the section 208, exhaust pipe, and exhaust mixer (not pictured). By incorporating several locations into the models 90 and 150, adjusted urea injection conditions can be determined that reduce urea wetting and crystallization throughout the exhaust system instead of at just a single location (e.g., the section 220).

While the Wall Wetting Model 90 and Crystallization Model 150 are illustrated separately in FIG. 6, it will be appreciated that the two models can be combined in a single model. Additionally, while the embodiment illustrated in FIG. 6 incorporates actual NOx reductant dosed as an input to the Wall Wetting Model 90, NOx reductant demand can be used instead of actual NOx reductant dosed, such as in the embodiment illustrated in FIG. 4. However, using actual NOx reductant dosed as an input will typically provide more accurate modeling of the NOx reductant within the exhaust system and a more effective adjusted NOx reductant demand 156 output, if desired.

To implement the methods provided herein, the appropriate input and output controls are incorporated into the exhaust system. For example, the temperature and exhaust flow are determined (e.g., measured) to begin the Wall Wetting Model 90 and crystallization model 150. Alternatively, the temperature and exhaust flow can be estimated; however, actual measurements may result in more accurate adjusted NOx reductant demand 80, 120, 156 outputs.

The system and methods in accordance with the embodiments of the present disclosure can be built into a production vehicle during assembly (e.g., on an assembly line), or can be added as an aftermarket modification to an already-built vehicle. For example, an aftermarket modification of the vehicle may include installing a temperature sensor 204A and an exhaust flow sensor 204B in the exhaust system, as well as installing a controller 202 (or adapting a pre-existing onboard controller) to interface with the temperature sensor 204A, exhaust flow sensor 204B and NOx reductant injector 212 (and optionally a NOx reductant sensor 204C). Additionally, the installed controller or existing onboard controller could be configured to implement the Wall Wetting Model 90 and/or Crystallization Model 150 in accordance with the embodiments described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of using an on-board vehicle computing system to control a flow rate of reductant solution injected by an injector into an exhaust flow from an engine producing nitrogen oxides towards a catalyst, the method comprising:
   (a) determining, by the on-board vehicle computing system, a first value of a first operating parameter;
   (b) determining, by the on-board vehicle computing system, a first value of a second operating parameter;
   (c) determining, by the on-board vehicle computing system, a first injector flow rate parameter corresponding to the flow rate of reductant solution being injected into the exhaust flow by the injector;
   (d) determining, by the on-board vehicle computing system, a first reductant solution puddle size based on at least the determined first injector flow rate parameter;
   (e) determining, by the on-board vehicle computing system, a reductant solution puddle delta based on at least one of the first injector flow rate and the determined first reductant solution puddle size;
   (f) determining, by the on-board vehicle computing system, a second injector flow rate parameter of the reductant solution based on at least the determined first injector flow rate parameter and the determined reductant solution puddle delta; and
   (g) adjusting, by the on-board vehicle computing system, the flow rate of the reductant solution injected by the injector to a flow rate corresponding to the determined second injector flow rate parameter.

2. The method of claim 1, further comprising:
   determining, by the on-board vehicle computing system, a third injector flow rate parameter of the reductant solution based on at least the determined first value of the first operating parameter, the determined first value of the second operating parameter, the determined first reductant solution puddle size, and the determined second injector flow rate parameter; and
   adjusting, by the on-board vehicle computing system, the flow rate of reductant solution injected by the injector to a flow rate corresponding to the determined third injector flow rate parameter.

3. The method of claim 1, wherein the determined first injector flow rate parameter corresponds to a first demand flow rate, wherein the first demand flow rate is a predetermined amount of the reductant solution injected by the injector into the exhaust flow.

4. The method of claim 1, wherein the first injector flow rate parameter corresponds to an actual flow rate, wherein the actual flow rate is the actual amount of the reductant solution injected by the injector into the exhaust flow.

5. The method of claim 1, wherein at least one of the second injector flow rate parameter and the first reductant puddle size is determined based on at least one of the determined first value of the first operating parameter and the determined first value of the second operating parameter.

6. The method of claim 1, wherein the first operating parameter and the second operating parameter are independently selected from the group consisting of an exhaust temperature, an exhaust flow, an exhaust pipe diameter, an exhaust pipe surface area, an ambient air temperature, a reductant evaporation time constant, an exhaust water content, and a vehicle speed, and wherein the first operating parameter and the second operating parameter are different from one another.

7. A non-transitory computer-readable medium having computer-executable instructions stored thereon for controlling a flow rate of a reductant solution into an exhaust flow from an engine producing nitrogen oxides towards a catalyst with an injector, wherein the instructions, in response to execution by one or more on-board vehicle computing devices, cause the one or more on-board computing devices to:
   determine an amount of a reductant for reacting with nitrogen oxides, the reductant solution to be injected by solution an injector into an exhaust flow from an engine producing nitrogen oxides towards a catalyst, the one or more computing devices using the steps:
   (a) receive a first value of a first operating parameter input;
   (b) receive a first value of a second operating parameter input;
   (c) receive a first injector flow rate parameter corresponding to the flow rate of reductant solution injected by the injector into the stream of exhaust;
   (d) determine a first reductant solution puddle size based on at least the received injector flow rate parameter;
   (e) determine a reductant solution puddle delta based on at least the first reductant solution puddle size based on at least the determined first reductant solution puddle size;
   (f) determine a second injector flow rate parameter of the reductant solution based on at least the determined reductant solution puddle delta and the received first injector flow rate parameter; and
   (g) adjust the flow rate of reductant solution injected by the injector into the stream of exhaust corresponding to the second injector flow rate parameter.

8. The computer-readable medium of claim 7, wherein the instructions, in response to execution by one or more on-board vehicle computing devices, further cause the one or more on-board computing devices to determine at least one of the first reductant solution puddle size and the reductant solution puddle delta based on at least one of the first value of the first operating parameter input and the first value of the second operating parameter input.

9. The computer-readable medium of claim 7, wherein the instructions, in response to execution by one or more on-board vehicle computing devices, further cause the one or more on-board computing devices to:
   determine a third injector flow rate parameter using the first value of the first operating parameter input, the first value of the second operating parameter input, the determined reductant solution puddle size, and the determined second injector flow rate parameter; and
   adjust the flow rate of reductant solution injected by the injector to a flow rate corresponding to the third injector flow rate parameter.

10. The computer-readable medium of claim 7, wherein the received first injector flow rate is an actual flow rate, and wherein the actual flow rate is a measured amount of the reductant solution injected by the injector into the exhaust flow.

11. The computer-readable medium of claim 7, wherein the first injector flow rate parameter is a first demand flow rate input, and wherein the first demand flow rate input is a predetermined amount of the reductant solution to be injected by the injector into the exhaust flow.

12. The computer-readable medium of claim 7, wherein at least one of the first operating parameter and the second operating parameter is a measured parameter.

13. The computer-readable medium of claim 12, wherein the first operating parameter and the second operating parameter are independently selected from the group consisting of an exhaust temperature, an exhaust flow, an exhaust pipe diameter, an exhaust pipe surface area, an ambient air temperature, a reductant evaporation time constant, an exhaust water content, and a vehicle speed, and wherein the first operating parameter and the second operating parameter are different from one another.

14. A system for injecting a determined amount of a reductant solution for reacting with nitrogen oxides into an exhaust flow from an engine producing nitrogen oxides, the system comprising:
   (a) an injector configured to inject the reductant solution into the exhaust flow;
   (b) a first sensor configured to measure a first operating parameter of the exhaust flow;
   (c) a second sensor configured to measure a second operating parameter of the exhaust flow; and
   (d) a wall wetting controller configured to:
      determine a first injector flow rate;
      determine a first reductant solution puddle size based on at least the first injector flow rate;
      determine a reductant solution puddle delta based on the first injector flow rate and the determined first reductant solution puddle size;
      determine a second injector flow rate based on the first injector flow rate and the determined reductant solution puddle delta; and
      transmit a first control signal to the injector, wherein the first control signal is based on the second injector flow rate, and wherein the injector is configured to adjust a flow rate of the reductant solution injected into the exhaust flow to the second injector flow rate in response to receiving the first control signal.

15. The system of claim 14, wherein the first injector flow rate is a first demand flow rate that is a predetermined amount of the reductant solution to be injected into the exhaust flow.

16. The system of claim 4, further comprising an injector flow rate sensor configured to measure the flow rate of reductant solution injected by the injector, and wherein the first injector flow rate is the flow rate measured using a sensor.

17. The system of claim 14, wherein the wall wetting controller is further configured to:
   determine the first reductant solution puddle size based on at least one of the first operating parameter and the second operating parameter; and
   determine the reductant solution puddle delta based on at least one of the first operating parameter and the second operating parameter.

18. The system of claim 14, wherein the first operating parameter and the second operating parameter are independently selected from the group consisting of an exhaust temperature, an exhaust flow, an exhaust pipe diameter, an exhaust pipe surface area, an ambient air temperature, a reductant evaporation time constant, an exhaust water content, and a vehicle speed, and wherein the first operating parameter and the second operating parameter are different from one another.

19. The system of claim 14, further comprising a crystallization controller that is configured to:
   (a) determine a third injector flow rate based on measured values of the first operating parameter and the second operating parameter and the determined values of the first reductant puddle size and the second injector flow rate; and
   (b) transmit a second control signal to the injector, wherein the second control signal is based on the third injector flow rate, and wherein the injector is configured to adjust the flow rate of the reductant solution injected into the exhaust flow to the third injector flow rate in response to receiving the second control signal.

* * * * *